April 28, 1964  R. BRAUN  3,131,329
ARRANGEMENT WITH PHASE-DEPENDENT MEASUREMENT
PARTICULARLY FOR RELAYS
Filed Sept. 3, 1959  2 Sheets-Sheet 1

INVENTOR
Roland Braun

BY Pierce, Scheffler & Parker
ATTORNEYS

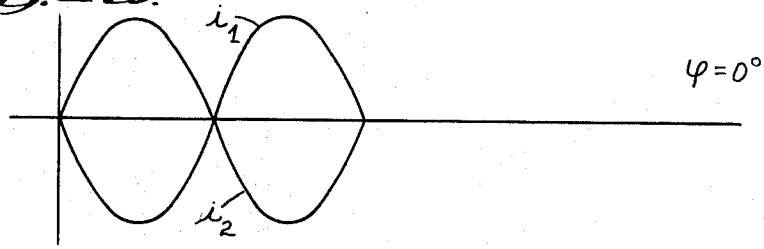
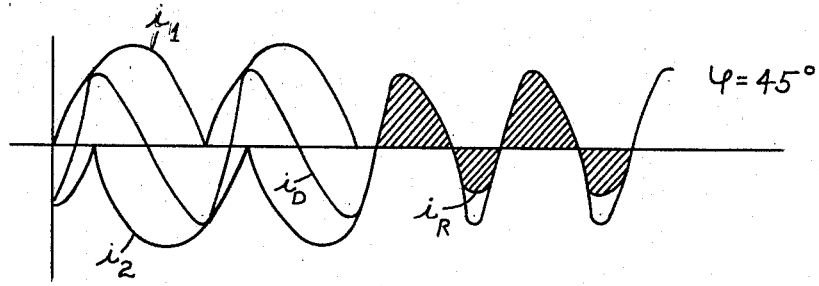
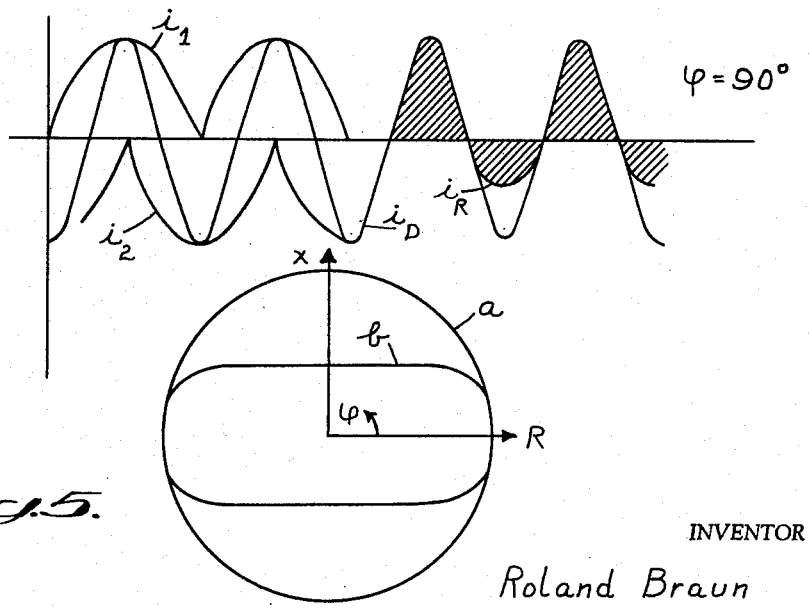

United States Patent Office 3,131,329
Patented Apr. 28, 1964

3,131,329
ARRANGEMENT WITH PHASE-DEPENDENT MEASUREMENT PARTICULARLY FOR RELAYS
Roland Braun, Nussbaumen, near Baden, Switzerland, assignor to Aktiengesellschaft Brown, Boveri & Cie, Baden, Switzerland, a joint-stock company
Filed Sept. 3, 1959, Ser. No. 837,868
Claims priority, application Switzerland Sept. 3, 1958
8 Claims. (Cl. 317—27)

The invention concerns arrangements, particularly for impedance relays, which compare two or more measuring quantities, for example, voltage and current, and depend on the mutual phase position.

In these relays, which compare the supplied A.-C. measuring quantities directly, such a phase-dependence is achieved in this way that a quotient is formed which is about proportional to the respective circuit. Depending on the phase position of current and voltage, one then obtains, with an otherwise equal amplitude, a different value of the reactance. These relays are known as reactance relays. The dependence has been achieved by feeding both measuring quantities to certain measuring systems which are phase-sensitive, for example, induction measuring systems.

In recent times, relays have also been used whose measuring values are rectified and fed to a measuring bridge. In this measuring bridge is arranged a switch element, for example, a relay, with a D.-C. measuring device, which measures the difference of the currents flowing in the bridge branches. The switch element can be so designed, for example, that it deflects toward one or the other side, depending on the direction of the current passing through it. The measuring values are mostly fed to the bridge over current transformers. If the currents are equal, the mean value of the current in the bridge, that is, in the switch element, remains zero. If one or the other measuring quantity predominates, a current will flow in the switch element in one or the other direction. The state of equilibrium corresponds practically to the tripping value of the relay; it is considered as the response value of the relay. In one direction of the current flowing in the bridge, the relay is to carry out a command, for example, disconnect a switch. In the other direction, the switch must not be actuated or another command will be transmitted.

In order to utilize both measuring quantities in such a device it has been customary up to now to influence the A.-C. measuring quantities before their rectification, so that their amplitude becomes dependent on the phase. This can be achieved by addition, for example, of voltage drops on inductances and capacitances. One can also form, to this end, from the supplied measuring quantities, a new measuring quantity by addition or subtraction, which is fed separately to the bridge circuit. These methods have the disadvantage, however, that expensive A.-C. elements have to be used and that the more favorable properties of D.-C. elements can not be utilized. The circuit and the space requirement are also greater.

In order to utilize the phase position on the D.-C. side and thus to avoid these disadvantages, it is suggested according to the present invention to connect a one-way electric valve parallel to the switch element, so that the amplitudes of the positive and negative half waves of the current flowing through the switch element will be different, depending on the phase between the measuring quantities.

The inventive concept will be described in further detail in conjunction with three different embodiments thereof and from the accompanying drawings wherein:

FIGS. 2a, 2b and 2c are a series of three graphs showing three assumed different phase relationships between the measuring quantities involved;

FIG. 5 is a circle diagram for an impedance relay used in connection with an explanation of the advantages of the invention.

Figure 1:
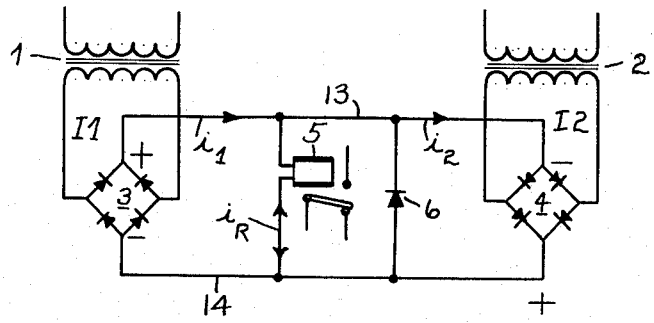
FIG. 1 is a schematic electrical diagram of one embodiment of the invention wherein a one-way valve is arranged in parallel with the relay switching element.

With reference now to FIGS. 1 and 2, the two measuring quantities to be compared as to phase relationship are designated I1 and I2. They are fed respectively to a D.-C. bridge circuit, for example, over the transformers 1 and 2. The bridge circuit consists of the two bridge branches formed by the rectifier groups 3 and 4 which provide full wave rectification for the measuring quantities I1 and I2, and the bridge formed by the relay 5 serving as a switch element. To this end can be used, for example, a polarized relay which deflects toward one or the other side, depending on the direction of the current passing through it and which gives different commands. Connected in parallel to the relay 5 is arranged the one-way valve 6 which can be a crystal diode, for example. The currents flowing through the rectifier groups 3 and 4 are designated respectively by $i_1$ and $i_2$ and these currents flow in the directions indicated by the arrows. It will be seen from FIG. 1 that the positive and negative output terminals of rectifier group 3 are connected to the negative and positive output terminals of rectifier group 4 respectively by lines 13 and 14 and the winding of relay 5 is connected between lines 13 and 14. Due to the crystal diode 6, arranged parallel to the relay 5, a non-linear resistance-combination is now formed in this bridge. The desired phase-dependence of the arrangement can thus be achieved. This is shown in FIGS. 2a, 2b and 2c which represent respectively the form of the curves of the currents $i_1$ and $i_2$ for three assumed phase difference angle $\varphi$ relationships, namely 0 deg., 45 deg., and 90 deg. Their amplitudes are identical in each case. With a phase difference angle equal to 0 degrees, the half waves of rectified current $i_2$ $i_1$ are always opposite in sign due to the manner in which the full wave rectifier groups 3 and 4 are arranged and are also always of equal magnitude, i.e. both reach zero and maximum values at the same time as is depicted in FIG. 2a. Thus for 0 degree phase difference one current $i_1$ cancels out the other current $i_2$ in the bridge circuit and hence the relay 5 receives no current. The left part of the curves in FIGS. 2b and 2c contains the individual currents $i_1$ and $i_2$, and their difference $i_D$; the right part again this difference $i_D$ and the current $i_R$ passing through the relay. Without the diode 6, the current $i_R$ would be in any case equal to the differential current $i_D$, and the mean value of the current $i_D = i_R$ would be zero for each phase difference position depicted by FIGS. 2b and 2c over a cycle of operation. In other words the mean value of the alternating difference current flow $i_D$ through the relay in one direction of flow during one of its half cycles would be equal to the mean value of the current flow $i_D$ through the relay in the opposite direction during the next following half cycle. Consequently, the relay would remain non-responsive. Due to the diode 6, however, which is connected parallel to the relay 5 a part of the current $i_D$ will be branched off from relay 5 for flow through diode 6 during that half of the cycle of the phase difference current $i_D$ which is determined by the poling of the diode 6 so that a smaller current flows through the relay during one half cycle of the phase difference current $i_D$ than during the next half cycle when the current flow through the diode 6 is blocked. Consequently, the mean value of the current flow in one direction through relay 5 is smaller than in the other direction and hence the curve form of the current flowing through the relay is asymmetrical. This is equivalent to a superposed direct current so that the relay 5 will respond when there is a phase difference despite equal amplitude of the quantities measured at the rectifiers 3 and 4. Only with a phase difference angle of zero as in FIG. 2a is the current $i_R$ zero, because the current flowing through the bridge is zero and the diode is ineffective in this case.

At a phase difference angle $\varphi$ of 45 deg. between the two measured quantities as shown in FIG. 2b, a differential current $i_D$ is formed. Without a diode 6 the currents would also cancel each other, since the negative and positive half waves of the difference current $i_D$ are equal. Due to the action of the diode 6, however, a part of the negative half wave only is sucked or branched off the relay 5, so that the mean value of the current $i_R$ is now positive. In spite of the equal amplitude of the two measuring values, one can thus obtain a phase-dependence measurement. The difference between the greater positive half wave and the lesser negative half wave of $i_R$ is indicated by hatching the surfaces circumscribed by them. The difference has an even greater effect if the phase difference angle $\varphi$ is 90 deg. as it is shown in FIG. 2c. The result is that the relay 5 with the parallel valve 6 shifts at other amplitudes of the measuring values, depending on the phase angle.

Figure 3:
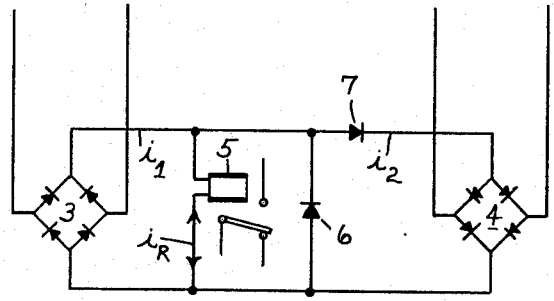
FIG. 3 is a schematic electrical diagram showing another embodiment of the invention wherein an additional one-way valve is placed in one of the bridge arms.
Figure 4:
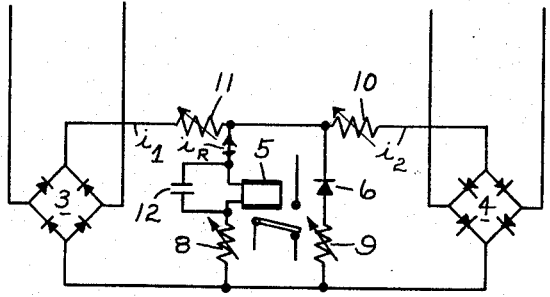
FIG. 4 is also a schematic electrical diagram of still a third embodiment wherein resistance and capacitance elements are used in conjunction with the various main circuit components to improve the overall performance of the system.

An increase of the phase dependence can be achieved, as shown in FIG. 3 by arranging an additional valve 7 with a possibility high initial resistance in one branch of the bridge. The internal resistance is thus increased in this branch, so that the sensitivity of the circuit for small measuring quantities becomes higher. Even without the "suction" diode 6, a similar effect would be obtained as in the above described arrangement, since the rectifier group 3, due to its low internal resistance, takes over the function of the "suction" diode. It suffices also to design the rectifier groups 3 and 4 with different characteristics or to provide additional resistances which have different values in both branches. In order to influence and improve the method of operation further and to offset differences in the various elements used which are caused in the manufacture it is possible to use resistances as shown in FIG. 4. These resistances can have different purposes. The resistance 8 connected in series with relay 5 and the condenser 12 connected in parallel with relay 5 represents a smoothing arrangement for the relay current. A variation of the effect of the "suction" valve 6 can be achieved by a valuable resistance 9 connected in series therewith. The resistances 10 and 11 are provided in the branches of the bridge to influence the characteristics of the rectifier groups 3 and 4. These too can be made variable.

The advantage for the above described arrangement is that it eliminates the necessity of special switch elements on the A.-C. side or additional transformers to achieve the phase dependence, and that the devices are simpler and cheaper. Besides, a simple adjustability and adaptability can be achieved with special consideration of variable resistances. A substantial advantage is the favorable form of the phase-dependence. This can be seen particularly clearly from the representation of the method of operation of the relay in the resistance diagram of FIG. 5 where the ohmic resistance R is plotted on the abscissa and the inductive reactance X on the ordinate. If proportional currents are fed to the arrangement of the voltage and the current, the resistance $U/i$ is measured with it. The line plotted in the diagram is the geometric locus of all points at which the relay shifts. This line varies depending on the type of the relay. A phase-independent relay, that is, an impedance relay, has in this representation a circle with its origin as the center. This is represented in FIG. 5 (circle $a$). Since the distance of each circle point from zero is equal, the relay responds at each phase angle to the same impedance value. A phase-dependence is then formed when either the circle is displaced with regard to the origin or when the curve has the form of an ellipse or a similar form. With the present methods, an elliptical dependence could only be achieved by introducing a third measuring quantity on the bridge circuit. The above described arrangement represents, however, already a simple means, by suitable layout of the valves and of the provided resistances, if necessary, to obtain elliptical forms. This can be seen from curve $b$ of FIG. 5, which can be achieved by means of the "suction" diode. One can see the partly approximated rectilinear form of the curve. This is of particular advantage for the independence of the relay from the arc resistances which falsify the measured short circuit impedance.

I claim:
1. In an arrangement for measuring the difference in phase between two alternating current quantities produced respectively by first and second circuit means, the combination comprising first and second rectifier means connected respectively to said first and second circuit means, further circuit means interconnecting said first and second rectifier means such that the positive and negative output terminals of said first rectifier means are connected by first and second conductors to the negative and positive output terminals respectively of said second rectifier means, a switching device such as a relay having the winding thereof connected between said first and second conductors, and a one-way electric valve also connected between said first and second conductors in parallel with said relay winding.

2. A measuring arrangement as defined in claim 1 wherein said electric valve is constituted by a rectifier.

3. A measuring arrangement as defined in claim 2 wherein a resistance is connected in series with the rectifier.

4. A measuring arrangement as defined in claim 3 wherein said resistance is variable in magnitude.

5. A measuring arrangement as defined in claim 1 and which further includes a rectifier in one of said conductors interconnecting said first and second rectifier means.

6. A measuring arrangement as defined in claim 1 and which further includes a resistance connected in series with one of said conductors.

7. A measuring arrangement as defined in claim 6 wherein said resistance is adjustable.

8. A measuring arrangement as defined in claim 1 and which further includes a variable resistance connected in series with the winding of said relay between said first and second conductors and a condenser connected in parallel with said relay winding.

References Cited in the file of this patent

UNITED STATES PATENTS

| | | |
|---|---|---|
| 2,758,278 | Adams | Aug. 7, 1956 |
| 2,781,457 | Urban | Feb. 12, 1957 |
| 2,923,884 | Moss | Feb. 2, 1960 |

FOREIGN PATENTS

| | | |
|---|---|---|
| 307,865 | Switzerland | Mar. 4, 1952 |
| 413,692 | Great Britain | July 20, 1934 |
| 566,232 | Germany | Dec. 13, 1932 |
| 892,470 | Germany | Oct. 8, 1953 |
| 901,082 | Germany | Jan. 7, 1954 |

OTHER REFERENCES

Electronics, January 1956, pages 138–140.